Jan. 12, 1960 A. LIEBSCHER 2,921,117

BEAM REGISTRATION SYSTEM

Original Filed Jan. 27, 1948

INVENTOR.
Arthur Liebscher
BY [signature]
ATTORNEY

United States Patent Office 2,921,117

Patented Jan. 12, 1960

2,921,117

BEAM REGISTRATION SYSTEM

Arthur Liebscher, Jenkintown, Pa., assignor to Radio Corporation of America, a corporation of Delaware Continuation of abandoned application Serial No. 4,660, January 27, 1948. This application September 23, 1952, Serial No. 310,944

28 Claims. (Cl. 178—5.4)

This invention relates to color television and more particularly to the pickup, transmission and reproduction of images in substantially their natural color.

This application is a continuation of my application, Serial No. 4,660, filed January 27, 1948, and entitled "Color Television System."

Images in substantially their natural color may be transmitted over electrical circuits by analyzing the light from the object into not only its image elements, but by also analyzing the light of the object into selected primary or component colors and deriving therefrom signal trains of impulses representative of each of the selected component colors. The image in substantially its natural color may then be reproduced at a remote location by appropriate reconstruction from the component color signal trains.

The transmission and reproduction of color images may be accomplished by either of two fundamental systems of multiple image transmission which have become widely known as the simultaneous and the sequential systems of color image transmission.

The simultaneous system transmits all component color signal trains simultaneously through three separate signal channels.

The sequential system transmits at any one time only one component color signal train, and transmits in predetermined sequence a portion of each of the selected component color signal trains.

The device employed for converting light from an object into a signal train is commonly known as a television camera. In the transmission of images by the sequential method, the camera may have a single image pickup tube, such as, for example, the so-called image orthicon, which is exposed in succession to images giving color separation corresponding to the various selected component colors. During the period that the camera tube is exposed to each color component image, the mosaic is concurrently scanned to enable the transmission of signals representing the corresponding color separation image.

Image pickup tubes may take various forms. An image orthicon camera is shown and described in an article entitled "Image Orthicon Camera" by R. D. Kell and G. C. Sziklai in the "RCA Review" for March 1946.

In the conventional sequential multicolor television receiver, a kinescope or other image producing tube is employed to recreate a black and white image likeness which is viewed or projected through a color filter of the selected component color corresponding to the desired component color instantaneously being represented. The process is then repeated for the next selected color component, and so on. A typical sequential color television system is shown and described in an article entitled "An Experimental Color Television System," beginning on page 141 of the "RCA Review" for June 1946.

Although color images have been successfully reproduced by the afore-mentioned sequential method, there are certain fundamental difficulties involved which tend to reduce the entertainment value of the sequential system. Typical difficulties involved include color action fringes, resulting from movement between individual component color scannings, and inadequacy of illumination, which results from the required division of available light for the reproduction in a sequential manner of the individual selected color component images.

The fundamental difficulties, particularly the color action fringes, referred to above for the sequential method are eliminated if the rate of change between the selected component colors is made rapid enough to overcome any indication of movement between the different selected color representations.

If, for example, an "elemental" sequential rate is employed, that is, if each image element is divided into three selected component colors, and for each elemental area of the image there are transmitted sequentially three different color representations, each of whose amplitude or energy depends upon the selected color components of the image element, no difficulty will be experienced with color action fringes.

It becomes apparent, however, that such an arrangement would require not only accurate synchronism in the scanning raster, but it would require also proper color phasing by such means as maintaining an accurate synchronism or speed control in each traverse of the scanning element in order that the corresponding color representation at both the transmitter and receiver would be scanned in perfect synchronism.

According to this invention, an improved method and arrangement is provided whereby color television signals are transmitted in an elemental sequential arrangement and there is employed a sweep speed synchronizing pulse having a repetition rate elemental frequencies. In one form of the invention, the sweep speed synchronizing pulse is developed in the transmitter by employment of a strip type filter involving not only the red, blue and green components, but also an ultraviolet filter for producing a uniform signal impulse upon scanning. In the receiver, the sweep speed synchronizing pulse is compared with a pulse developed by the scanning operation in the receiving tube. The two sweep speed pulses are compared to control the sweep speed in the image reproducing tube, whereby to effect the desired color phasing.

A primary object of this invention is therefore to provide an improved color television system.

Another object of this invention is to eliminate color action fringes in sequential color television systems.

Still another object of this invention is to eliminate registration problems in color television systems.

Still another object of this invention is to maintain accurate sweep speed synchronism at the receiving station with the sweep speed of deflection at the transmitting stations.

Other and incidental objects of the invention will be apparent to those skilled in the art from a reading of the following specification and an inspection of the accompanying drawing in which.

Figures 1, 2, 3:
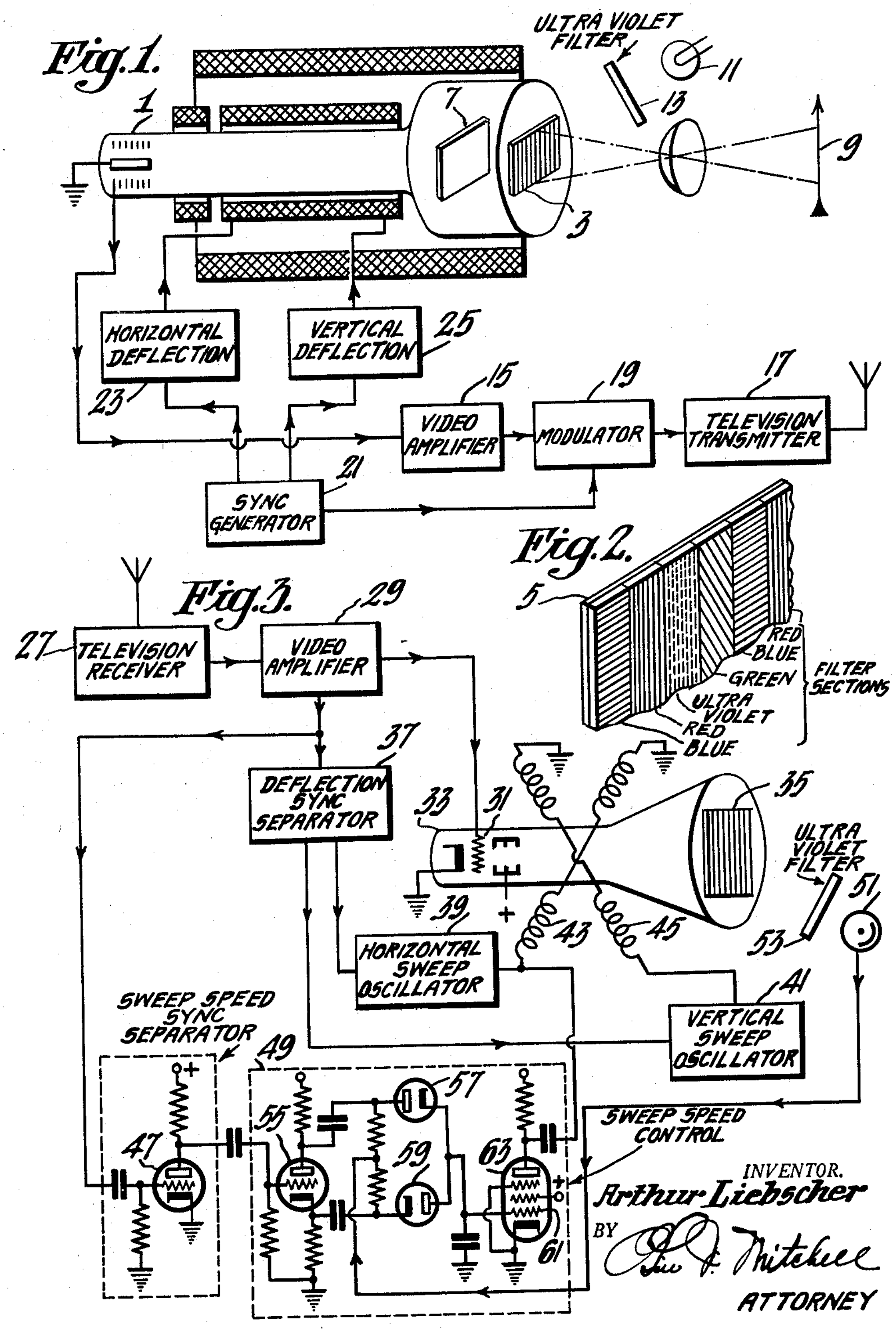
Figure 1 shows in block diagram on form of this invention as it may be employed at the transmitting station.
Figure 2 illustrates a greatly enlarged section of an electron beam scanning target.
Figure 3 shows by block and circuit diagram one form of this invention suitable for employment at the receiving stations.

Turning now in more detail to Figure 1, there is shown a transmitting tube 1, which, in general, may take any of the well-known forms. As shown, it takes the form of the well-known image orthicon type tube which is well shown and described in an article entitled "The Image Orthicon, A Sensitive Television Image Pickup Tube,"

published in the "Proceedings of the Institute of Radio Engineers" for July 1946.

Although details regarding circuit arrangements for maintaining deflection and focus of the scanning beam are not shown or described in detail, it is believed that various arrangements for accomplishing deflection and focus are well-known in the art and need no detailed description here.

The transmitting tube 1 does, however, have an important difference from that shown and described in the published art. This difference, in accordance with this invention, may be found in the structure of the target 3, which consists, in one form, of a plurality of similar groups of strip-like sections, each strip-like section of a group being limited in its representation to one different selected color component of a corresponding image sectional area or a reference signal impulse forming area.

A brief reference to Figure 2 will more clearly illustrate the form of the electron beam target 3 of Figure 1. In Figure 2, the photo-emissive material 5 is located on the back of the similar groups of strip-like sections involving, as illustrated, filter elements of red, blue and green, together with a filter element of ultraviolet.

Although the target section shown in Figure 2 includes filter elements, the target structure may include, for transmitting purposes, a color sensitive photo mosaic surface. Another alternate arrangement may be employed when target 3 of Figure 1 is used in a transmitter tube without an image section. It will be seen that in the form of the invention shown in Figure 1, the target 3 involving the strip-like sections is not the target upon which the electron scanning beam of the tube 1 impinges. Target 7 of tube 1 is impacted by the electron beam of tube 1. In accordance with a well-known theory of the image tube, the target 3 produces an electron image which is electrically focussed on target 7.

Turning again to Figure 2, it follows that if the light approaches from the front, the photosensitive area 5 will have an electrical representation developed thereon, depending upon the color of the incident light and the color of the associated filter section. If, for example, a red light is projected upon the target 3 from the object 9 of Figure 1, only that portion of the photosensitive element 5 behind the red filter sections will be activated. Therefore, the signal developed by the scanning operation of tube 1 will provide signal impulses only at the time the electron scanning beam scans the area of target 7 corresponding to the area behind each of the red filter sections of target 3 of tube 1. This is true for each of the selected component colors.

If, however, a lamp 11 is provided with an ultraviolet filter 13 in order to provide a constant illumination of ultraviolet light on electrode 3, a series of substantially uniform pulses will be developed as the scanning beam traverses target 7. A pulse will be formed each time the scanning beam traverses a section of target 7 which corresponds to the section of electrode 3 which is immediately behind the ultraviolet filter sections.

It will therefore be seen that if no light is projected on electrode 3 from object 9, and if lamp 11 illuminates electrode 3 with an ultraviolet light, a series of impulses will be developed in transmitter tube 1 whose rate of recurrence is equal to the rate of deflection of the scanning beam across the ultraviolet filter sections.

If, for example, the filter sections illustrated in Figure 2 are made of a size such that each group of filter sections involving a red, blue, green and ultraviolet section is made to correspond with an image element size, the signal impulses generated by the scanning of the ultraviolet filter sections will correspond to an elemental frequency.

If this beam traverse speed control signal developed by the scanning operation of transmitting tube 1 is transmitted, together with video signals developed as a result of the light projected on electrode 3 by colored object 9, the combination may be employed at the receiver for not only the reproduction of images, but also the receiving system scanning traverse speed control.

In the form of the invention shown in Figure 1, the signal developed by the transmitter tube 1 is amplified in video amplifier 15 and caused to modulate the television transmitter 17 by modulator 19.

Modulator 19 also receives a deflection synchronizing signal from sync generator 21. The deflection synchronizing signal of synchronizing generator 21 is also employed in the well-known manner for the control of horizontal deflection and vertical deflection of the transmitter tube 1 through horizontal deflection control 23 and vertical deflection control 25.

Turning now to Figure 3, there is illustrated a television receiver 27, which may take any of the well-known forms capable of the reception of a relatively wide signal pass band.

Video amplifier 29 provides the control electrode 31 of image reproducing tube 33 with potential variations to control the intensity of the developed scanning beam in accordance with the video signal.

The image reproducing tube 33 may take, in general, any of the well-known forms, such as, for example, the popular kinescope, which is well described in the published art.

There is, however, an important difference in the kinescope 33 modified to operate in accordance with this invention. The difference resides in the screen 35 which, in the form of the invention shown, takes the form of adjacently positioned and similar groups of strip-like sections, wherein each strip-like section of the group is limited in its effective reproduction to one different selected color component of the corresponding image sectional area. The enlarged view of the multiple target may take the form of that shown in Figure 2, wherein the red, blue, green and ultraviolet filter sections are applied to the light producing element, which might take the form of a white phosphor 5.

The beam generation and deflection involved in kinescope 33 follows the well-known forms of employing a deflection sync separator 37 and producing from the separated synchronizing impulse a horizontal sweep frequency in horizontal sweep oscillator 39, and a vertical sweep signal in vertical sweep oscillator 41.

The appropriate sweep energy is applied to horizontal and vertical deflection coils 43 and 45, also in the well-known manner.

As has been outlined above, it is necessary, for accurate color representation, to employ careful synchronism in not only deflection, but in the rate or speed of deflection.

The sweep speed is controlled by obtaining from video amplifier 29 the sweep speed synchronizing impulses developed at the transmitting station, as described above under Figure 1. This is accomplished by a clipping action in tube 47, which is appropriately biased to clip off only a portion of the signal train developed in video amplifier 29. In the form of the invention shown, this sweep speed synchronizing pulse is developed in a "white" direction.

The sweep speed synchronizing pulse is then transmitted to a sweep speed control, illustrated by dotted block 49, which operates to compare the sweep speed synchronizing pulse obtained from the transmitting system with the impulses developed at photocell 51, which is located behind an ultraviolet filter 53, with respect to the screen 35 of image reproducing tube 33.

As the electron beam of kinescope 33 scans the target 35, an impulse will be formed in tube 51 each time the scanning beam traverses the ultraviolet filter section of target 35. Due to the limitation of ultraviolet filter 53, no impulses will be formed in photoelectric cell 51 while the scanning beam is scanning the red, blue or green filter sections of target 35.

If the signal pulses obtained in photocell 51 are compared with the sweep speed synchronizing pulses obtained from the transmitter, it will be seen that an accurate sweep speed synchronization may be obtained between the scanning beam of the transmitter tube 1 and the scanning beam of the receiver tube 33. If, then, the order of the filter sections of the target 3 of Figure 1 and the target 35 of Figure 3 is arranged in the same order, it will be seen that the scanning beams of both the transmitter tube 1 of Figure 1 and the receiving image produced on target 35 will correspond precisely, and the resultant image produced on target 35 will correspond to the image projected on the target 3 of Figure 1.

Although various arrangements are available for comparing the synchronizing sweep speed impulse with the impulses derived from photocell 51, the circuit arrangement shown in Figure 3 is given by way of example.

The sweep speed control circuit 49 involves a phase splitter amplifier 55, which develops, together with diodes 57 and 59, a voltage which is dependent upon the synchronism of the sweep speed synchronizing signal derived from the transmitter and the impulses obtained from photocell 51.

The operation of the circuit arrangement employed for sweep speed control is well-known in the art and is illustrated in detail in the U.S. Patent No. 2,458,156, issued to G. L. Fredendall.

It will be seen, after a brief examination of the circuit arrangement shown in block 49 of Figure 3, that the potential applied to the control electrode 61 of tube 63 is dependent upon whether or not the impulses derived from photocell 51 lead or lag the impulses of the sweep speed synchronizing impulses obtained from the transmitting system.

It therefore follows that the output signal obtained from tube 63 is dependent upon the sweep speed of the electron beam developed in receiving tube 33.

The output energy from tube 63 may therefore be applied to horizontal deflection coils 43 or it may be applied to an auxiliary horizontal deflection coil not shown. It will be seen, therefore, that the output energy of tube 63 will control the sweep or traverse speed of the scanning beam of image reproducing tube 33 to synchronize accurately with the scanning speed of the electron beam developed in transmitter tube 1 of Figure 1.

This accurate control of sweep speed of the scanning beam of tube 33 will result in accurate registration of corresponding color filter sections of both reproducing tube 33 and transmitter tube 1.

Having thus described the invention, what is claimed is:

1. In a color television system of the type employing the transmission of different selected component color image detail representative signals along each scanning line by the modulation of a carrier with image detail signals, scanning synchronizing pulses and a periodic color phasing signal, the combination of a modulated carrier signal receptor, signal separator circuits connected to said receptor for developing separate image detail signals, scanning synchronizing pulses, and a periodic color phasing signal, a luminescent target, an electron scanning beam, beam deflecting means responsive to said synchronizing pulses to cause said beam to scan said target, means connected to said separator circuits and responsive to said image detail signal for controlling the intensity of said beam, and means for developing, in response to said periodic color phasing signal, an auxiliary signal having a frequency which is a multiple of and greater than the frequency of said synchronizing pulses, and means responsive to said auxiliary signal for controlling color phasing.

2. In color television transmitting apparatus, means scanning an image line by line, means sequentially generating different selected color image detail representative signals along each scanning line, means generating line and field synchronizing pulses, and means generating a color phasing signal between each of said color sequences, the frequency of said color phasing signals being a multiple of and greater than the frequency of said line synchronizing pulses.

3. In a television transmitter a pickup tube having a target, said target comprising a plurality of groups of parallel lines of chargeable material in sequence, means for charging one line in each group in accordance with color information different from those of other lines of said groups, a separating line of chargeable material between successive ones of said groups, means charging each of said separating lines to a predetermined value, means scanning said target and means generating a signal from each of said lines as said target is scanned, said signals varying in accordance with the charges appearing on said lines.

4. In color television receiving apparatus, means developing color phasing pulses from received signals, the frequency of said pulses being a multiple of and greater than the frequency of the line synchronizing signals, a luminescent target, means scanning said target, means including said scanning means locally generating color phasing pulses, means generating a control signal which varies in accordance with the relative phase of said developed and generated color phasing pulses, and means applying said control signal to the deflection system of said scanning means.

5. In color television apparatus, a cathode ray tube having a target consisting of groups of parallel lines of material in sequence, each line in a group being responsive to color information different from those of the other lines of each group, a separating line of material between successive groups of lines, said separating lines being responsive to radiation energy outside of the visible spectrum, means causing the cathode ray beam of said tube to scan said target, means generating a color phasing signal each time said beam crosses one of said separating lines, means producing control signals from said color phasing signals, and means to apply said control signals to the beam deflection system of said tube.

6. In color television apparatus a cathode ray tube having a target consisting of groups of parallel lines of chargeable screen material in sequence, means for charging each line in a group in accordance with color information different from those of other lines of said group, a separating line of chargeable screen material between said groups, means charging each of said separating lines to a predetermined value by means of radiation energy outside of the visible spectrum, means causing the cathode ray beam of said tube to scan said target and means generating a color phasing signal each time said beam crosses one of said separating lines.

7. In a color television apparatus, a cathode ray tube having a target consisting of groups of parallel lines of screen material in sequence, each line in a group fluorescing in a color different from those of other lines in said group, separating lines of screen material between said groups, said separating lines fluorescing outside of the range of visible light, means causing the cathode ray beam of said tube to scan said target, means generating a color phasing signal each time said beam crosses one of said separating lines, means producing control signals from said color phasing signals, and means to apply said control signals to the beam deflection system of said tube.

8. A color television system employing a scanning beam for color reproduction comprising in combination a source of image detail signals, scanning line synchronizing pulses and periodic color phasing signals, said color phasing signals being remotely and locally generated, means for developing from said color phasing signals an auxiliary signal, said auxiliary signal having a frequency which is higher than the frequency of said line synchronizing pulses, and means utilizing said developed auxiliary signal for phasing the color reproduction.

9. In color television receiving apparatus for receiving waves including control signals and signals representative respectively of different component colors of the transmitted image and succeeding each other sequentially in regularly recurring order, means for producing electrons in the form of at least one electron beam, a screen comprising color representative phosphors effectively luminescent in different colors under impact of electrons, means for scanning the electrons over the screen, said scanning means and said screen being constructed so that different color representative phosphors are impinged upon by the electrons during each scanning line, and means responsive to the control signals in the received waves for controlling the energization of the different color representative phosphors along each separate scanning line to make their energization accord with the color representative signals in the received waves.

10. In color television receiving apparatus for receiving waves including control signals and signals occupying respectively different regularly recurring phases of a transmitting cycle and representative respectively of different component colors of the transmitted image, means for producing electrons in the form of at least one electron beam, a screen comprising representative phosphors effectively luminescent in different colors when energized under impact of electrons, means for scanning the electrons over the screen, said scanning means and said screen being constructed so that different color representative phosphors are impinged upon by the electrons during each scanning line, and means responsive to the control signals in the received waves for controlling the energization of the different color phosphors along individual scanning lines to make their energization accord with the different phases of the color representative signals in the received waves.

11. In color television receiving apparatus for receiving waves including field and line scanning synchronizing signals, additional control signals having a frequency much greater than and having a pre-determined fixed ratio to the frequency of the line synchronizing signals and signals occupying respectively different regularly recurring phases of a transmitting cycle and representative respectively of different component colors of the transmitted image, means for producing electrons in the form of at least one electron beam, a screen comprising color representative phosphors effectively luminescent in different colors when energized under impact of electrons, means under the control of the field and line scanning synchronizing signals for scanning the electrons over the screen, said scanning means and said screen being constructed so that different color representative phosphors are impinged upon by the electrons during each scanning line, and means responsive to said additional control signals in the received waves for controlling the energization of the different color representative phosphors along each separate scanning line to make their energization accord with the different phases of the color representative signals in the received waves.

12. In color television receiving apparatus for receiving waves including control signals and signals representative respectively of different component colors of the transmitted image and succeeding each other sequentially in regularly recurring order, means for producing an electron beam, a screen containing color representative phosphors effectively luminescent in different colors when energized under impact of the electron beam, means for scanning the electron beam over the screen, said scanning means and said screen being constructed so that different color representative phosphors are impinged upon by the beam in regular order of recurrence during each scanning line, and means responsive to control signals in the received waves for controlling the energization of the different color phosphors along each separate scanning line to make their energization accord with tde sequence of color representative signals in the received waves.

13. In color television receiving apparatus for receiving waves including control signals and signals occupying respectively different regularly recurring phases of a transmitting cycle and representative respectively of different component colors of the transmitted image, means for producing an electron beam, a screen containing color representative phosphors effectively luminescent in different colors when energized under impact of the electron beam, means for scanning the electron beam over the screen, said scanning means and said screen being constructed so that different color representative phosphors are impinged upon by the beam in regular order of recurrence during each scanning line, and means responsive to control signals in the received waves for controlling the energization of the different color phosphors along each separate scanning line to make their energization accord with the different phases of the color representative signals.

14. In color television receiving apparatus for receiving waves including control signals and signals representative respectively of different component colors of the transmitted image and succeeding each other sequentially in regularly recurring order, means for producing an electron beam, a screen containing color representative phosphors effectively luminescent in different colors when energized under impact of the electron beam, means for scanning the electron beam over the screen, said scanning means and said screen being constructed so that different color representative phosphors are impinged upon by the beam in regular order of recurrence during each scanning line, and means for controlling the energization of the different color representative phosphors along each separate scanning line to make their energization accord with the sequence of color representative signals in the received waves, said means including a source of local oscillations at the receiver and connections for impressing on said source control signals in the received waves.

15. In color television receiving apparatus for receiving waves including control signals and signals occupying respectively different regularly recurring phases of a transmitting cycle and representative respectively of different component colors of the transmitted image, means for producing electrons in the form of at least one electron beam, a screen containing color representative phosphors effectively luminescent in different colors when energized under impact of electrons, means for scanning the electrons over the screen, said scanning means and said screen being constructed so that different color representative phosphors are impinged upon by the electrons during each scanning line, and means for controlling the energization of the different color representative phosphors along each separate scanning line to make their energization accord with the different phases of the color representative signals in the received waves, said last-mentioned means including control circuits, a source of local oscillations at the receiver, and connections for impressing on said control circuits said local oscillations and control signals in the received waves.

16. In color television receiving apparatus for receiving waves including control signals and signals representative respectively of different component colors of the transmitted image and succeeding each other sequentially in regularly recurring order, means for producing an electron beam, a screen containing substantially parallel color representative phosphor strips effectively luminescent in different colors when energized under impact of the electron beam, means for scanning the electron beam over scanning lines extending transversely of the strips, and means for controlling the energization of the different color representative phosphor strips along each separate scanning line to make their energization accord with the sequence of color representative signals in the received waves, said means including control circuits, means for impressing on the control circuits oscillatory energy produced by scanning action of the electron beam over the phosphor strips and connections for impressing on said control circuits control signals derived from the received waves.

17. In color television receiving apparatus for receiving waves including control signals and signals representative respectively of different component colors of the transmitted image and succeeding each other sequentially in regularly recurring order, means for producing an electron beam, a screen containing substantially parallel color representative phosphor strips effectively luminescent in different colors when energized under impact of the electron beam, means for scanning the electron beam over scanning lines extending transversely of the strips, and means for controlling the energization of the different color representative phosphor strips along each separate scanning line to make their energization accord with the sequence of color representative signals in the received waves, said means including circuits for controlling the scanning speed of the electron beam over individual scanning lines, means for impressing on said circuits oscillatory energy produced by scanning action of the electron beam over the phosphor strips, and connections for impressing on said control circuits control signals derived from the received waves.

18. In color television receiving apparatus for receiving waves including control signals and signals representative respectively of different component colors of the transmitted image and succeeding each other sequentially in regularly recurring order, means for producing an electron beam, a screen containing substantially parallel color representative phosphor strips effectively luminescent in different colors when energized under impact of the electron beam, means for moving the electron beam over scanning lines extending transversely of the strips, and means for controlling the energization of the different color representative phosphor strips along each separate scanning line to make their energization accord with the sequence of color representative signals in the received waves, said means including circuits for controlling the scanning speed of the electron beam over individual scanning lines, means for producing oscillatory energy related in frequency to the line scanning of the electron beam across the screen, connections for impressing the oscillatory energy on the circuits for controlling the scanning speed, and connections for also impressing on said circuits control signals derived from the received waves.

19. In a color television system, means for transmitting waves including field and line scanning synchronizing signals, additional control signals and image signals occupying respectively different regularly recurring phases of a transmitting cycle and representative respectively of different component colors of the transmitted image, and a receiver comprising means for producing electrons in the form of at least one electron beam, a screen comprising color representaive phosphors effectively luminescent in different colors under impact of electrons, means under control of the transmitted field and line scanning synchronizing signals for scanning the electrons over the screen, said scanning means and said screen being constructed so that different color representative phosphors are impinged upon by the electrons during each scanning line, and means responsive to the additional control signals for controlling the energization of the different color representative phosphors along each separate scanning line to make their energization accord with the different phases of the color representative signals in the transmitted waves.

20. Apparatus according to claim 19 in which the additional control signals are of a frequency much greater than the line synchronizing signals and have a fixed ratio to the frequency of the line synchronizing signals.

21. Apparatus according to claim 20 in which the additional control signals are of substantially elemental frequency.

22. In a color television system, means for transmitting waves including field and line scanning synchronizing signals, additional control signals and image signals occupying respectively different regularly recurring phases of a transmitting cycle and representative respectively of different component colors of the transmitted image, and a receiver comprising means for producing an electron beam, a screen comprising color representative phosphors effectively luminescent in different colors under impact of electrons, means under control of the transmitted field and line scanning synchronizing signals for scanning the electron beam over the screen, said scanning means and said screen being constructed so that different color representative phosphors are impinged upon by the electron beam during each scanning line, and means for controlling the energization of the different color representaive phosphors along individual scanning lines to make their energization accord with the different phases of the color representative signals in the transmitted waves, said last-mentioned means including control circuits, a source of local oscillations at the receiver, and connections for impressing on said control circuits said local oscillations and the transmitted additional control signals.

23. Apparatus according to claim 22 in which the additional control signals are of a frequency much greater than the line synchronizing signals and have a fixed ratio to the frequency of the line synchronizing signals.

24. Apparatus according to claim 23 in which the additional control signals are of substantially elemental frequency.

25. In a color television receiver, means for receiving a composite wave including line synchronizing signals defining line intervals therebetween, image signals occupying respectively different regularly recurring phases of a transmitting cycle and representative respectively of different component colors of an image to be reproduced, and additional control signals for frequency much greater than the line synchronizing signals of fixed phase with respect to said regularly recurring phases of said image signals and having a fixed ratio to the frequency of the line synchronizing signals, means for separating the additional control signals from said composite wave, means sensitive to the phases of said image signals coupled to said receiving means and including an image reproducing tube for producing an image in accordance with information derived from said image signals, and phasing control circuits coupled to said separating means and responsive to said additional control signals for controlling the operation of said last named means throughout each line interval.

26. Apparatus according to claim 25 in which the additional control signals are of substantially elemental frequency.

27. In combination: a source of an intelligence signal; a source of a second signal synchronized with said intelligence signal and having a parameter indicative of the rate of change of intelligence in said intelligence signal; a cathode ray tube including a source of an electron beam, a beam intensity control electrode, a screen adapted for light emission from a plurality of parallel strip-like regions, and a plurality of strip-like indexing elements placed near spaced ones of said strip-like regions, each of said indexing elements being responsive to beam impingement to produce an indexing signal indicative of such impingement, means for applying said intelligence signal to said beam intensity control electrode; means for deflecting said beam to cause it to scan said screen relatively slowly in a direction generally parallel to said strip-like regions and to said indexing elements and relatively rapidly in a direction generally transverse to said strip-like regions and to said indexing elements, said last-named means being responsive to a control signal to vary the rate of deflection of said beam in said direction transverse to said strip-like regions and to said indexing elements; means for deriving from said indexing signal a signal having a parameter indicative of the rate of traversal of said indexing elements by said beam; a signal comprising circuit having a pair of input circuits and an output circuit, said input circuits being supplied with said last-named signal and with said second signal respectively and said signal comparing circuit being responsive to relative changes in said parameters of said supplied signals to produce in said output circuit a signal indicative of said relative changes; and means for applying said last-named signal to said deflection means as a control signal to alter the rate of deflection of said beam by said means.

28. In color television receiving apparatus including a source of signals occupying respectively different regularly recurring phases of a transmitting cycle and representative respectively of different component colors of the transmitted image and periodic color phasing signals, means for producing electrons in the form of at least one electron beam, an electron-responsive screen adapted to emit light of different colors from a plurality of strip-like regions arranged in repeating groups, said screen having index material distributed thereacross for effectively producing index signals in response to electron impingement, means for scanning the electrons across said screen transversely of said strip-like regions, said scanning means and said screen being constructed so that strip-like regions of different color emission characteristics are successively impinged upon by the electrons during each scanning line, means for deriving from said index material an oscillating electrical index wave substantially throughout individual scanning lines, and means utilizing said received periodic color phasing signals and responsive to said index wave for controlling the emission of color light from said strip-like regions along individual scanning lines to make such color light emission accord with the different phases of the color representative signals from said source.

References Cited in the file of this patent

UNITED STATES PATENTS

| | | |
|---|---|---|
| 2,415,059 | Zworykin | Jan. 28, 1947 |
| 2,490,812 | Huffman | Dec. 13, 1949 |
| 2,621,244 | Landon | Dec. 9, 1952 |
| 2,621,245 | Kell | Dec. 9, 1952 |